United States Patent
Kaschke et al.

(10) Patent No.: US 6,943,955 B2
(45) Date of Patent: Sep. 13, 2005

(54) STEREOSCOPIC DISPLAY SYSTEM HAVING A SINGLE DISPLAY

(75) Inventors: Michael Kaschke, Oberkochen (DE); Ludwin Monz, Ulm (DE)

(73) Assignee: Carl-Zeiss-Stiftung, Heidenheim (DE)

( * ) Notice: Subject to any disclaimer, the term of this patent is extended or adjusted under 35 U.S.C. 154(b) by 63 days.

(21) Appl. No.: 10/025,461

(22) Filed: Dec. 26, 2001

(65) Prior Publication Data

US 2002/0080496 A1 Jun. 27, 2002

(30) Foreign Application Priority Data

Dec. 23, 2000  (DE) .......................................... 100 65 050

(51) Int. Cl.⁷ ........................ G02B 27/14; G02B 27/22; G02B 27/24; G09G 5/00; G02C 1/00
(52) U.S. Cl. ........................ 359/630; 359/464; 359/471; 345/8; 351/158
(58) Field of Search ............................... 359/630, 632, 359/462, 464, 466, 471; 345/7, 8; 351/158

(56) References Cited

U.S. PATENT DOCUMENTS

| | | | |
|---|---|---|---|
| 5,106,179 A | | 4/1992 | Kamaya et al. .............. 351/158 |
| 5,142,642 A | * | 8/1992 | Sudo ........................... 348/47 |
| 5,371,556 A | | 12/1994 | Suwa et al. ................. 351/158 |
| 5,526,184 A | | 6/1996 | Tokuhashi et al. .......... 359/630 |
| 5,539,422 A | * | 7/1996 | Heacock et al. ............... 345/8 |
| 6,055,109 A | * | 4/2000 | Hur ............................. 359/630 |
| 6,239,908 B1 | * | 5/2001 | Kelly .......................... 359/480 |
| 6,348,994 B1 | * | 2/2002 | Geier et al. ................. 359/465 |

FOREIGN PATENT DOCUMENTS

| | | |
|---|---|---|
| AU | B-80423/94 | 6/1996 |
| DE | 196 26 097 | 10/1997 |
| EP | 0 704 737 | 4/1996 |
| JP | 09-146046 | 6/1997 |

\* cited by examiner

Primary Examiner—George Epps
Assistant Examiner—William Choi
(74) Attorney, Agent, or Firm—Walter Ottesen

(57) ABSTRACT

The invention relates to stereoscopic display system having a single display (7). Right and left partial images are sequentially displayed on the display (7). For the viewing, two separate component beam paths (21, 22) for viewing only left partial images (21) and only right partial images (22) and a switchover device (5, 9) are provided. The switchover device (5, 9) couples in the data, which is shown on the display, from a common part of the viewing beam path alternately into the two separate component beam paths in synchronism with the display of the right and left partial images on the display. In one embodiment, the switchover device includes a polarization switch (5) and a polarization beam splitter (9). The polarization switch (5) is arranged either in the illuminating beam path or in the common part of the viewing beam path.

16 Claims, 4 Drawing Sheets

STEREOSCOPIC DISPLAY SYSTEM HAVING A SINGLE DISPLAY

FIELD OF THE INVENTION

The invention relates to a stereoscopic display system on which right and left partial images can be displayed sequentially in time.

BACKGROUND OF THE INVENTION

Stereoscopic display systems of this kind are described, for example, in German patent 41 34 033 and in published international patent application WO 96/04581. The system described in German patent 41 34 033 builds upon a conventional television monitor having a Brown tube on which the right and left partial images are alternately displayed in the field method and a polarization switch is switched in synchronism with the display of the right and left partial images. The polarization switch is mounted forward of the monitor. The stereoscopic viewing impression then results because of the viewing of the images, which are shown on the monitor, with the aid of passive polarization spectacles.

In published international patent application WO 96/04581, a projection system having a digital mirror display (DMD) is described and this projection system is intended to be utilized for vision testing, especially also for stereoscopic vision testing. For the stereoscopic vision testing, a rapidly rotatable filter disc having polarization filters of different polarization is mounted either in the viewing beam path or in the illumination beam path of the DMD. The stereoscopic viewing takes place, in turn, with passive polarization spectacles placed forward of the eyes of the person tested.

Furthermore, so-called head-mounted display devices are described in U.S. Pat. Nos. 5,106,179; 5,371,556; and, 5,526,184. These devices are all worn directly on the head of the observer. Separate component beam paths are provided for the left and right eye in such head-mounted displays. For this reason, separate displays for the right and left eye are usually provided of which one is viewed only by the right eye and the other is viewed only by the left eye.

SUMMARY OF THE INVENTION

It is an object of the invention to provide a stereoscopic display system which has a simple and compact configuration and is especially suited for use in display devices worn on the head.

The stereoscopic display system according to the invention includes a single display on which right and left partial images can be displayed sequentially. According to a feature of the invention, two separate component beam paths are provided for viewing of which the one beam path leads only to the left eye of the observer and the other leads only to the right eye of the observer and correspondingly, the one beam path serves only for transmitting the left partial images and the other beam path serves only for transmitting the right partial images. A switchover device is provided which, in synchronism with the presentation of the right and left partial images on the display, couples in the data, which is shown on the display, from a common part of the viewing beam path alternately into the two separate component beam paths, respectively.

The switchover device can include a mirror switchable into and out of the viewing beam path. A system of this kind affords the advantage that it functions without a polarization separation and, as a consequence, is not very critical with respect to a disturbing crosstalk of the illustrated image data in the incorrect component beam path.

In an alternate embodiment, a polarization switch is provided either in the illuminating beam path or in the common part of the viewing beam path. With this polarization switch, the polarization direction of the light is switched in synchronism. The subsequent partitioning of the common viewing beam path into the two component beam paths takes place via a polarization beam splitter. As an alternative to a polarization beam splitter, a conventional partially transmitting mirror can be provided for the beam splitting when polarization filters are provided in the separate component beam paths having transmission directions crossed with respect to each other. When the invention is used as a so-called head-mounted display placed on the head of the viewer, preferably one of the two beam paths has a transfer optic which compensates for the path length difference between the display and the two eyes of the viewer.

According to another feature of the invention, the display system also has a single display on which right and left partial images can be displayed sequentially. The system furthermore includes an illuminating beam path for the display by which the display is illuminated sequentially with light of different polarization directions. The illuminating beam path for the display includes a polarization beam splitter via which the light originating from two light sources is superposed on each other.

This system affords the special advantage that the entire light, which is present in the viewing beam path, or the light which is present on the projection screen, can get to one of the two eyes of the viewer without a filtering or attenuation taking place. Such a system is therefore characterized by an especially high brilliance. Furthermore, problems of incomplete extinguishment, as can occur with rapidly switched polarization switches or polarization filters rotating in the beam path, are avoided.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
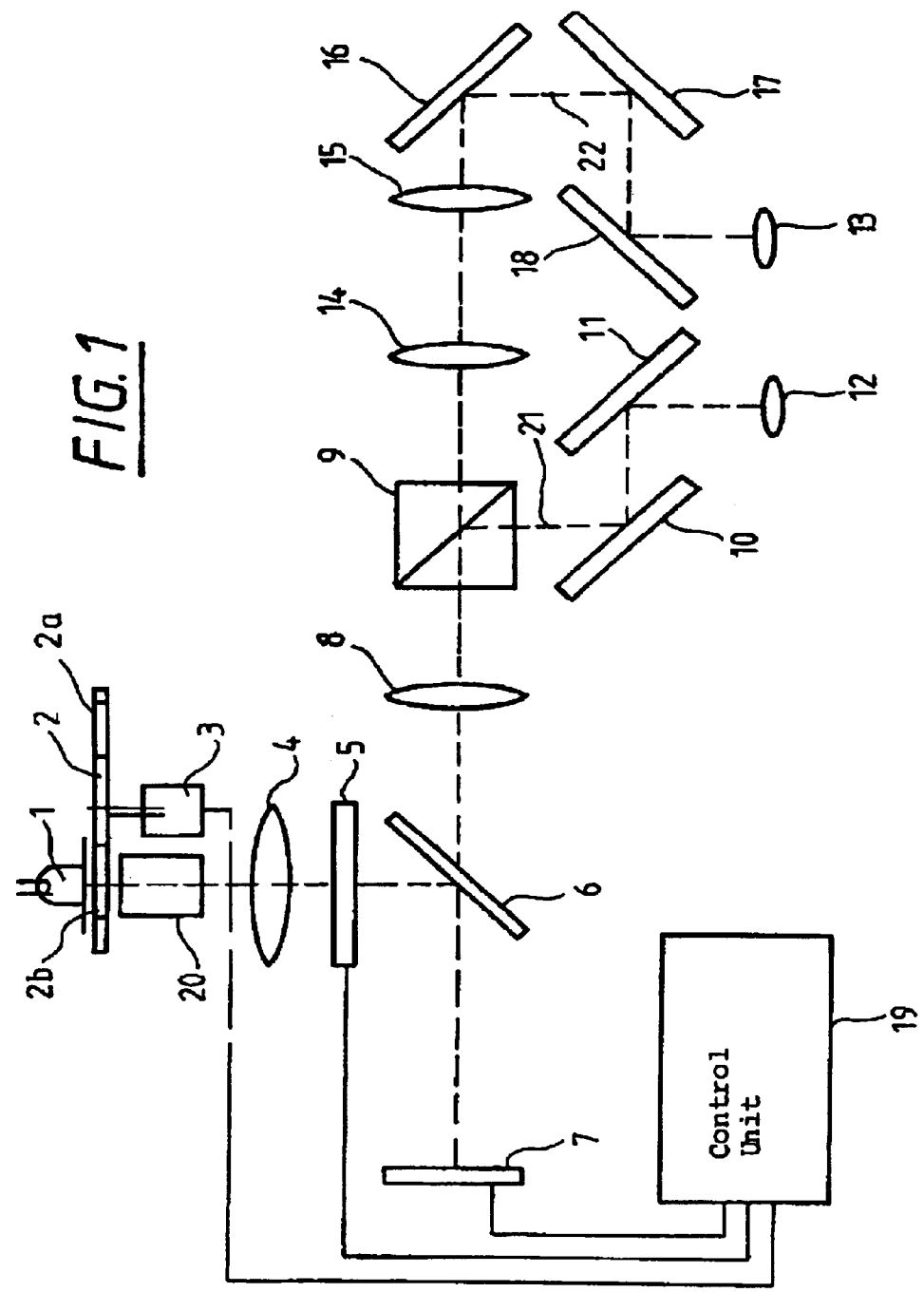
FIG. 1 is a schematic of a stereoscopic display system according to the invention.

The embodiment shown in FIG. 1 includes a single light source 1, for example, a cold light lamp or a white LED having a downstream color filter wheel 2. The color filter wheel 2 includes three different color filters of which only filters 2a and 2b are shown. The first filter transmits only red light, the second only blue light, and the third only green light. The rotational movement of the color filter wheel 2 is controlled via a drive motor 3.

A beam homogenizer 20 follows the color filter wheel 2 in light direction and a collimator optic unit 4 follows the beam homogenizer. The light exiting from the beam homogenizer is collimated by the collimator optic unit 4. A polarization switch 5 follows the collimator optic 4 via which the polarization of the transmitted light can be switched between two orthogonal polarization directions (horizontal/vertical, left-circular/right-circular). The light of the illuminating beam path is directed by a downstream beam splitter 6 to a reflective display 7, for example, a DMD. The polarization switch 5 can be configured as a large-area liquid crystal system via which the transmitted light is polarized differently depending upon the voltage applied to the electrodes.

A video control unit 19 drives the display 7 and likewise the polarization switch 5 and the drive motor 3 for the color filter wheel 2. The control takes place in such a manner that, for each stereoscopic partial image, the wanted video information is offered sequentially in the three basic colors, red, green and blue. A total color stereoimage pair is accordingly made up of a total of six individual images. Here, either the three color images, which belong to one stereoscopic partial image, can be offered sequentially, that is, the switchover frequency of the polarization switch 5 amounts to ⅓ of the image frequency of the display 7 and of the switching frequency of the color filter wheel 2 or the respective stereoscopic partial images are presented sequentially in the same color. In the last case, the switching frequency of the polarization switch 5 is twice as high as the switch frequency of the color filter wheel 2.

With the aid of the beam splitter 6, a separation of the viewing beam path from the illuminating beam path takes place. In the common part of the viewing beam path, an imaging optic 8 is first arranged and thereafter a polarization beam splitter 9 is provided via which a partitioning into separate component beam paths (21, 22) for the two eyes of the viewer takes place. Two additional deflecting mirrors (10, 11) are provided in the component beam path 21 deflected at the polarization beam splitter 9. The deflected beam path 21 is deflected twice by 90° at the two additional deflecting mirrors (10, 11). In the component beam path 22, which is transmitted through the polarization beam splitter 9, a transfer optic (14, 15) follows after the polarization beam splitter 9 and thereafter follow three deflecting mirrors (16, 17, 18) which deflect the component beam path 22 a total of three times, each by 90°, so that the two component beam paths (21, 22) run parallel to each other after deflection at the respective last mirrors (11 and 18).

The imaging optic 8 in the common part of the viewing beam path is so designed that it images the display 7 behind the last deflecting mirror 11 of the component beam path 21 into the focal plane of a left ocular 12. The component beam path 21 is provided for the left eye. The transfer optic (14, 15) in the component beam path 22, which is transmitted through the polarization beam splitter 9, is so designed that, notwithstanding the longer path length, the display is imaged in the component beam path 22 via the optic 8 and the transfer optic (14, 15), at the same imaging scale as for the left eye, in the focal plane of the right ocular 13 behind the deflecting mirror 18.

With the polarization beam splitter 9 in the common part of the viewing beam path together with the polarization switch 5 in the illuminating beam path, it is achieved that only the image information, which is provided for the left eye, is coupled into the component beam path provided for the left eye and only the image information, which is provided for the right eye, is coupled into the component beam path leading to the right eye. The polarization switch 5 and the polarization beam splitter 9 are correspondingly matched to each other so that the light, which is transmitted through the polarization switch 5, is completely reflected or completely transmitted at the polarization beam splitter 9 in each of the two switching states of the polarization switch 5.

The embodiment shown in FIG. 1 is especially suitable for reflecting stereoscopic images into microscopes. The configuration of the viewing beam path corresponds essentially to the configuration of conventional binocular viewing tubes. An adjustment to different pupil spacings of the viewer is possible especially by a rotation of the component units (10, 11, 12) or (17, 18, 13) about corresponding ones of the parallel optical axes (21, 22). The component units each comprise two deflecting mirrors and the ocular corresponding thereto.

Figure 6:
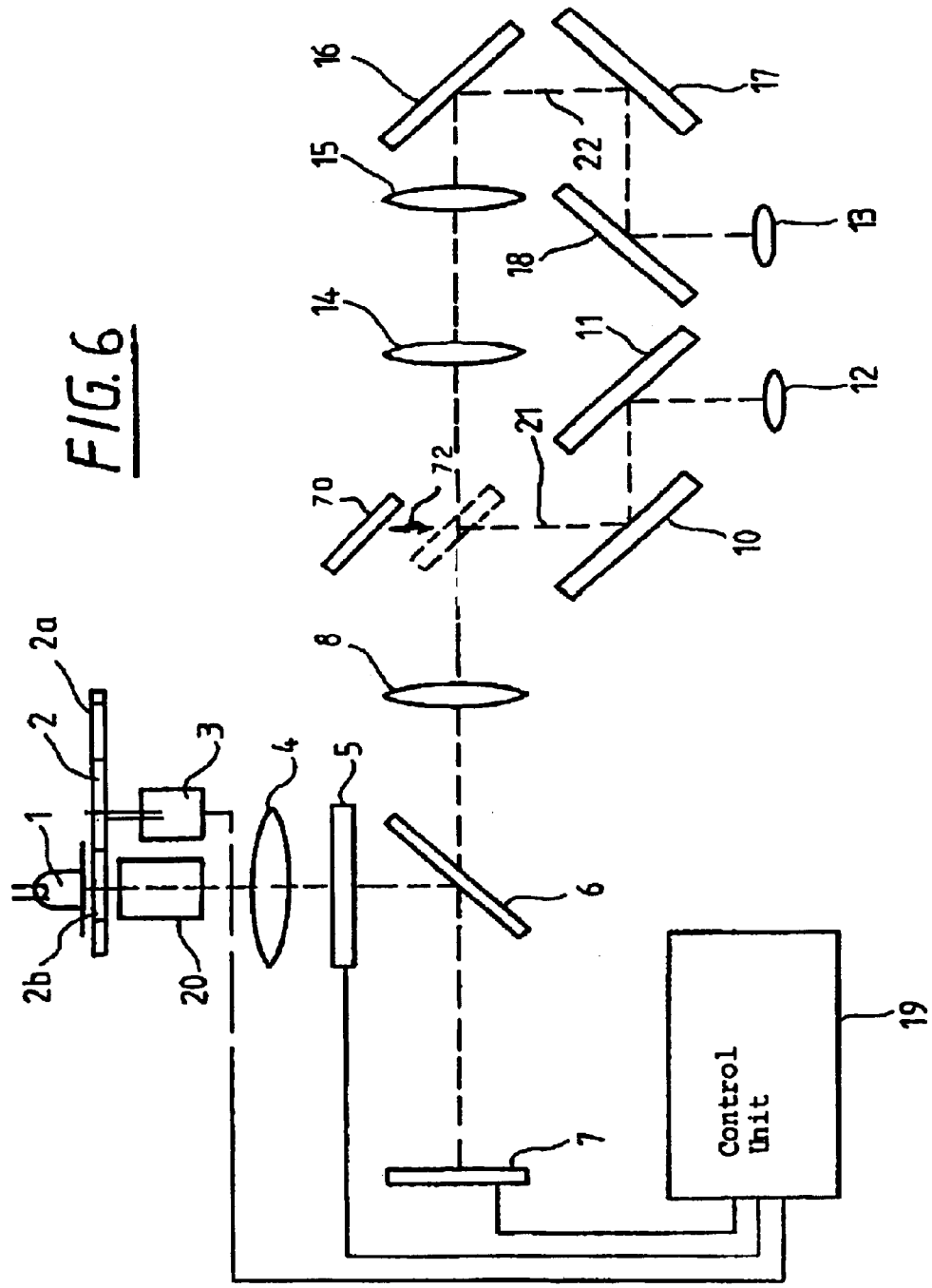

An embodiment which differs slightly from the embodiment of FIG. 1 results in that the polarization switch 5 is mounted in the common part of the viewing beam path instead of in the illuminating beam path. The polarization switch 5 is mounted, for example, between the imaging optic 8 and the polarization beam splitter 9. A further embodiment, which departs slightly, is shown in FIG. 6 and results in that, in lieu of a polarization switch 5 and a polarization beam splitter 9, a mirror 70 is provided at the location of the polarization beam splitter 9 or, more specifically, at the location of the divider surface of the polarization beam splitter. This mirror 70 can be switched into and out of the beam path and as indicated by double arrow 72 and the phantom outline of the mirror. The mirror 70 is switched in synchronism with the display of the right and left partial images.

Figure 2:
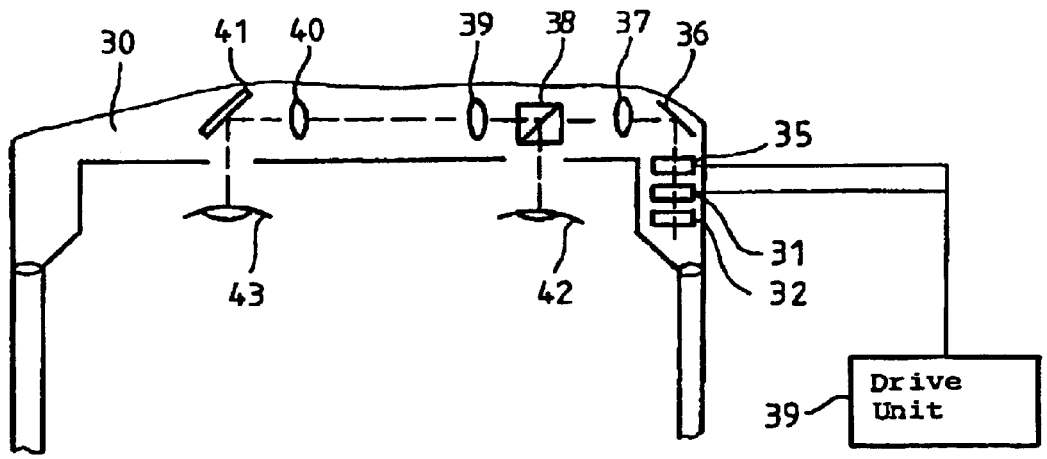
FIG. 2 is a second embodiment of the invention wherein the entire display system is integrated into a spectacle frame.

In the embodiment of FIG. 2, the entire display system is significantly miniaturized compared to the embodiment of FIG. 1 and, except for a drive unit 39, the display system is completely integrated into a spectacle frame 30 worn on the head of the viewer. The display 31 can be configured as an LCOS microdisplay having an edge length of 1 cm×1 cm or as another liquid crystal display based on silicon. The microdisplay 31 is illuminated sequentially by a miniaturized illuminating device 32 on an LED basis in the three base colors red, green and blue. A polarization switch 35 is arranged downstream of the microdisplay 31 in the common part of the viewing beam path. The polarization switch 35 is switched in synchronism with the display of the right and left partial images. A deflecting mirror 36 follows the polarization switch 35 and deflects the common viewing beam path perpendicularly to the viewing direction of the viewer. An imaging optic 37 follows the deflecting mirror 36 in the deflected part of the common viewing beam path and a polarization beam splitter 38 follows the imaging optic 37. The imaging optic 37 is so configured that the display 31 is imaged on the retina of the right eye 42 after deflection at the polarization beam splitter 38. A transfer optic (39, 40) follows in the component beam path transmitted through the polarization beam splitter 38 and a deflecting mirror 41 follows the transfer optic. The deflecting mirror 41 deflects the component beam path, which leads to the left eye 43, in the direction toward the eye 43. The transfer optic (39, 40) is so designed that, together with the imaging optic 37, the display 31 is imaged on the retina of the left eye 43 notwithstanding the longer light path to the left eye 43.

As in the embodiment described with respect to FIG. 1, the polarization beam splitter 38 and the polarization switch 35 are matched to each other in this embodiment so that the image information, which is displayed on the display 31, reaches either only the right eye 42 or only the left eye 43.

Figure 3:
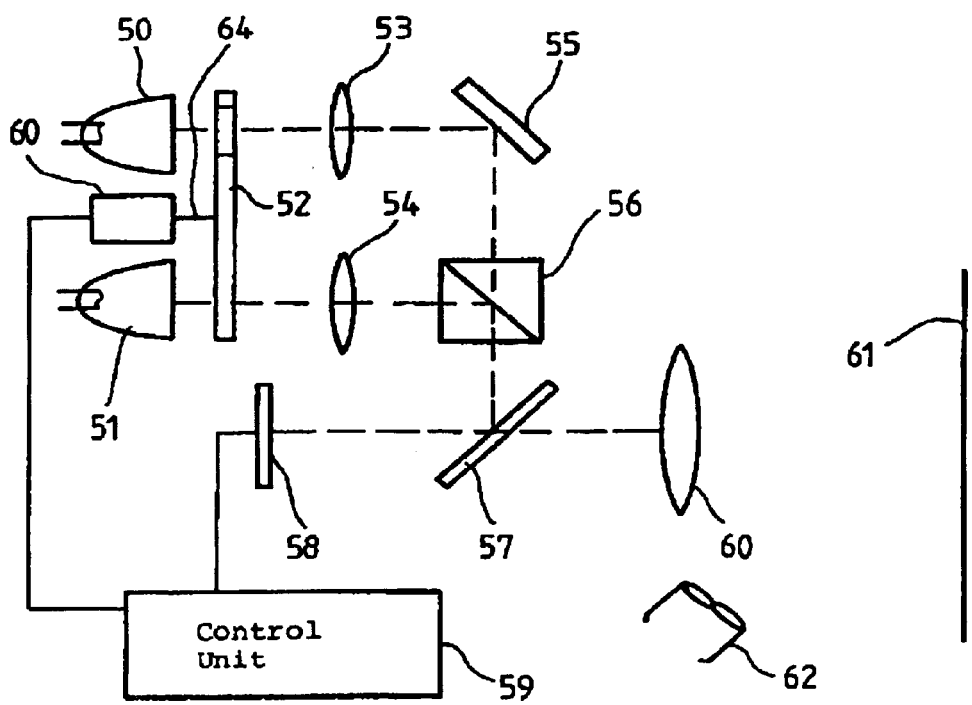
FIG. 3 is a schematic of a third embodiment of the stereoscopic display system of the invention.

The display system in FIG. 3 includes separate light sources (50, 51) for the display of the right and left stereoscopic partial images. A color filter wheel 52 and respective illuminating optics (53, 54) follow the light sources (50, 51). The color filter wheel 52 is described below in greater detail with respect to FIG. 4. After deflection of one of the two beam paths with the aid of a deflecting mirror 55, the two illuminating beam paths are superposed coaxially on one another with the aid of a polarization beam splitter 56 and are deflected to a reflective display 58 (for example, a DMD) with the aid of a deflecting mirror 57. The stereoscopic partial images displayed on the DMD 58 are projected on a screen 61 maintaining the polarization with the aid of a projection optic 60. The viewing of the stereoscopic partial images takes place here with polarization spectacles 52 which have respective polarization filters for the left and right eyes. The polarization filters have mutually perpendicular transmitting directions.

The drive of the display 58 takes place via a control unit 59 which functions simultaneously for driving the drive motor 60 for the color wheel filter 52.

Figure 4:
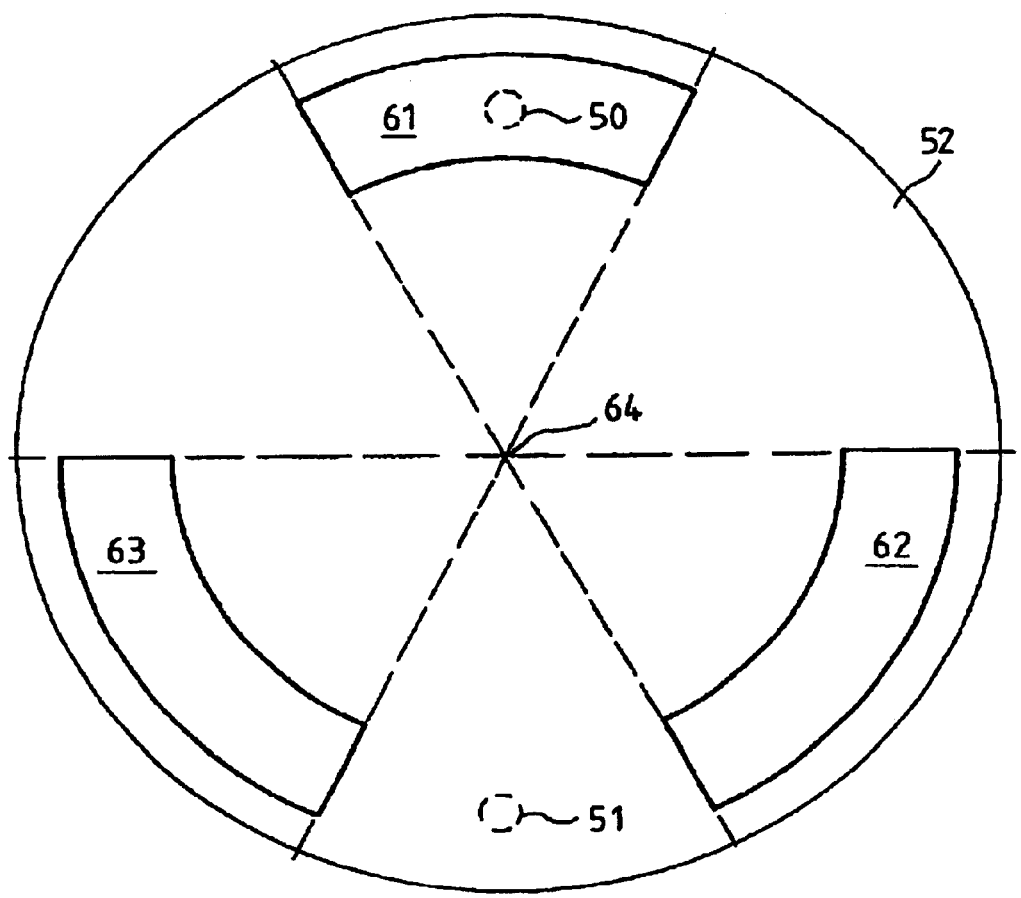
FIG. 4 is a plan view of a chopper disc in an illuminating system corresponding to the embodiment of FIG. 3.
Figure 5A:
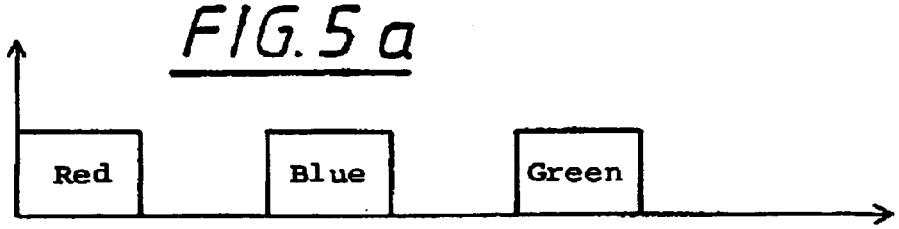
FIGS. 5a and 5b show the time-dependent trace of the light intensities in the two illuminating beam paths of the embodiment of FIG. 3; and, FIG. 6 is a stereoscopic display system according to another embodiment of the invention.
Figure 5B:
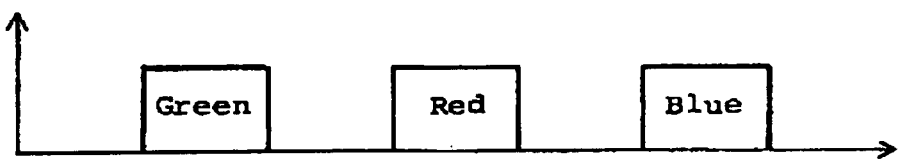

The color filter wheel 52 includes three filter regions (61, 62, 63) distributed over the periphery and these filter regions each extends over an angular region of 60° and are separated by non-transmitting regions which likewise extend over an angular region of 60°. One of the filter regions 61 includes a red-transmitting glass, a filter region 62 includes a green-transmitting glass and the third filter region 63 includes a blue-transmitting glass. The color light sequence, which results with this filter wheel 52 in the illuminating beam path of the lamp 50, is shown in FIG. 5a and, the resulting color light sequence in the illuminating beam path of lamp 51 is shown in FIG. 5b. Here, it is a condition precedent that the two lamps (50, 51) are arranged at 180° to each other with respect to the rotational axis 64 of the filter wheel 52 which is indicated in FIG. 4 by the phantom outline of the lamp positions. An essential advantage of this illuminating arrangement is that, for an image separation between right and left stereo partial images, no additional polarization switches are required in the illuminating beam path or in the viewing beam path. The task of the polarization switch is instead achieved via the filter wheel in combination with the polarization beam splitter 56.

In this embodiment, the filter wheel 52 is switched for the polarization separation in synchronism with the display of the right and left partial images (stated more precisely, of the respective color components of the left and right partial images) in that the filter wheel 52 is rotated further each time by 60° between two color partial images.

The illuminating unit having two light sources (50, 51) corresponding to FIG. 3 is of course not only applicable for large projection displays; rather, it affords the same advantages even for miniaturized displays, for example, in that the projection objective 60 and the screen 61 are replaced by a viewing tube corresponding to the embodiment of FIG. 1 with an imaging optic 8 and a polarization beam splitter 9. The polarization beam splitter 9 splits the common viewing beam path into two component beam paths.

In lieu of two light sources (50, 51) and a color filter wheel 52, which is arranged downstream of the light sources, it is also conceivable, for miniaturized stereoscopic display systems, to provide a red, blue and green LED, respectively, for each of the two viewing beam paths. The light of the LEDs is superposed one upon the other via a polarization beam splitter 56 and the LEDs are separately driven by the video control 59 in synchronism with the display of the stereoscopic color partial images in correspondence to the sequences shown in FIGS. 5a and 5b. A stereoscopic display system of this kind operates without any mechanically movable parts and without rapid polarization switches.

It is understood that the foregoing description is that of the preferred embodiments of the invention and that various changes and modifications may be made thereto without departing from the spirit and scope of the invention as defined in the appended claims.

What is claimed is:

1. A stereoscopic display system comprising:
   a single display for displaying right and left partial images sequentially in time;
   a first optical arrangement for defining a common viewing beam path along which said right and left partial images are transmitted;
   a second optical arrangement for splitting said common viewing beam path into separate first and second component beam paths for viewing only said left and only said right partial images, respectively;
   a switchover device for alternately coupling information shown on said display from said common viewing beam path separately into said first and second component beam paths in synchronism with the presentation of said left and right partial images on said display; and,
   said switchover device including a mirror switchable into and out of said beam path.

2. A stereoscopic display system comprising:
   a single display for displaying right and left partial images sequentially in time;
   a first optical arrangement for defining a common viewing beam path along which said right and left partial images are transmitted;
   a second optical arrangement for splitting said common viewing beam path into separate first and second component beam paths for viewing only said left and only said right partial images, respectively;
   a switchover device for alternately coupling information shown on said display from said common viewing beam path separately into said first and second component beam paths in synchronism with the presentation of said left and right partial images on said display; and,
   a partially transmitting mirror; polarization filters mounted in corresponding ones of said first and second component beam paths; and, said polarization filters having respective pass-through directions crossed with respect to each other.

3. The stereoscopic display system of claim 2, further comprising a light source for transmitting light along an illuminating beam path toward said display; and, said switchover device including a polarization switch mounted in said illuminating beam path or in said common viewing beam path.

4. A stereoscopic display system comprising:
   a single display for sequentially displaying right and left partial images;
   an optical arrangement for defining an illuminating beam path and for illuminating said display sequentially in time with light having first and second directions of polarization different from each other; and,
   said optical arrangement including a polarization beam splitter mounted in said illuminating beam path.

5. A stereoscopic display system comprising:
   a single display for sequentially displaying right and left partial images;

an optical arrangement for defining an illuminating beam path and for illuminating said display sequentially in time with light having first and second directions of polarization different from each other;

said optical arrangement including a polarization beam splitter mounted in said illuminating beam path; and, said optical arrangement further including two light sources for emitting respective beams of light and said polarization beam splitter being mounted to receive said beams of light and to coaxially superpose said beams of light one upon the other.

6. A stereoscopic display system comprising:

a single display for sequentially displaying right and left partial images;

an optical arrangement for defining an illuminating beam path and for illuminating said display sequentially in time with light having first and second directions of polarization different from each other;

said optical arrangement including a polarization beam splitter mounted in said illuminating beam path;

said optical arrangement further including two light sources for emitting respective beams of light and said polarization beam splitter being mounted to receive said beams of light and to coaxially superpose said beams of light one upon the other; and, a color filter wheel common to both of said light sources and mounted downstream thereof.

7. The stereoscopic display system of claim 6, further comprising a control unit for driving said color filter wheel in synchronism with a display of stereoscopic color sequences.

8. A stereoscopic display system comprising:

a single display for displaying right and left partial images sequentially in time;

first and second optical arrangements for defining respective viewing beam paths for viewing only said right and left partial images;

a switchover device for alternately coupling information shown on said display from said common viewing beam path separately into said first and second component beam paths in synchronism with the presentation of said left and right partial images on said display; and, said switchover device including a mirror switchable into and out of said beam path.

9. A stereoscopic display system comprising:

a single display for displaying right and left partial images sequentially in time;

first and second optical arrangements for defining respective viewing beam paths for viewing only said right and left partial images;

a switchover device for alternately coupling information shown on said display from said common viewing beam path separately into said first and second component beam paths in synchronism with the presentation of said left and right partial image on said display; and, a partially transmitting mirror; polarization filters mounted in corresponding ones of said first and second component beam paths; and, said polarization filters having respective pass-through directions crossed with respect to each other.

10. The stereoscopic display system of claim 9, further comprising a light source for transmitting light along an illuminating beam path toward said display; and, said switchover device including a polarization switch mounted in said illuminating beam path or in said common viewing beam path.

11. A stereoscopic display system comprising:

a single display for displaying right and left partial images sequentially in time;

a first optical arrangement for defining a common viewing beam path along which said right and left partial images are transmitted;

a second optical arrangement for receiving said common viewing beam path and defining separate first and second component beam paths for viewing only said left and only said right partial images, respectively; and, a switchover device including a mirror alternately switchable into and out of said common viewing beam path so as to permit information shown on said display to pass into said first component beam path separately when said mirror is in said common viewing beam path and to pass into said second component beam path separately when said mirror is switched out of said common beam path in synchronism with the presentation of said left and right partial images on said display.

12. The stereoscopic display system of claim 11, further comprising a light source for transmitting light along an illuminating beam path toward said display; and, said switchover device including a polarization switch mounted in said illuminating beam path or in said common viewing beam path.

13. The stereoscopic display system of claim 12, further comprising a partially transmitting mirror; polarization filters mounted in corresponding ones of said first and second component beam paths; and, said polarization filters having respective pass-through directions crossed with respect to each other.

14. The stereoscopic display system of claim 11, said second optical arrangement including a transfer optic in one of said separate first and second component beam paths.

15. A stereoscopic display system comprising:

a single display for displaying right and left partial images sequentially in time;

a first optical arrangement for defining a common viewing beam path along which said right and left partial images are transmitted;

a second optical arrangement for splitting said common viewing beam path into separate first and second component beam paths for viewing only said left and only said right partial images, respectively;

a switchover device for alternately coupling information shown on said display from said common viewing beam path separately into said first and second component beam paths in synchronism with the presentation of said left and right partial images on said display;

said switchover device including a polarization switch mounted in said illuminating beam path or in said common viewing beam path; and, a polarization beam splitter for splitting said common viewing beam path into said first and second component beam paths; and, a partially transmitting mirror; polarization filters mounted in corresponding ones of said first and second component beam paths; and, said polarization filters having respective pass-through directions crossed with respect to each other.

16. A viewing system worn by a person on the head, the viewing system comprising:

a bead gear which can be worn by a person on the head;

a stereoscopic display system integrated into said head gear and including:

a single display for sequentially displaying right and left partial images;

a first optical arrangement for defining a common viewing beam path along which said right and left partial images are transmitted;

a second optical arrangement for splitting said common viewing beam path into separate first and second component beam paths for viewing only said left and only said right partial images, respectively;

a switchover device for alternately coupling information shown on said display from said common viewing beam path separately into said first and second component beam paths in synchronism with the presentation of said left and right partial images on said display;

said switchover device including a polarization switch mounted in said illuminating beam path or in said common viewing beam path; and, a polarization beam splitter for splitting said common viewing beam path into said first and second component beam paths; and, a partially transmitting mirror; polarization filters mounted in corresponding ones of said first and second component beam paths; and, said polarization filters having respective pass-through directions crossed with respect to each other.

* * * * *

UNITED STATES PATENT AND TRADEMARK OFFICE
CERTIFICATE OF CORRECTION

PATENT NO. : 6,943,955 B2
DATED : September 13, 2005
INVENTOR(S) : Michael Kaschke and Ludwin Monz It is certified that error appears in the above-identified patent and that said Letters Patent is hereby corrected as shown below:

<u>Column 7,</u>
Line 59, delete "image" and substitute -- images -- therefor.

Signed and Sealed this

Eighth Day of November, 2005

JON W. DUDAS
*Director of the United States Patent and Trademark Office*